US011100556B2

(12) United States Patent
Li et al.

(10) Patent No.: US 11,100,556 B2
(45) Date of Patent: Aug. 24, 2021

(54) SCENARIO ENHANCED SEARCH WITH PRODUCT FEATURES

(71) Applicant: INTERNATIONAL BUSINESS MACHINES CORPORATION, Armonk, NY (US)

(72) Inventors: Jinfeng Li, Beijing (CN); Jian Xu, Shanghai (CN); Xiao Fei Sun, Beijing (CN); Chang Rui Ren, Beijing (CN); Zhang Li, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 252 days.

(21) Appl. No.: 16/205,595

(22) Filed: Nov. 30, 2018

(65) Prior Publication Data
US 2020/0175563 A1 Jun. 4, 2020

(51) Int. Cl.
*G06Q 30/06* (2012.01)
*G06N 20/00* (2019.01)
*G06F 16/9536* (2019.01)

(52) U.S. Cl.
CPC ..... *G06Q 30/0625* (2013.01); *G06F 16/9536* (2019.01); *G06N 20/00* (2019.01)

(58) Field of Classification Search
CPC ................................................ G06Q 30/06–08
(Continued)

(56) References Cited

U.S. PATENT DOCUMENTS 7,860,803 B1 * 12/2010 Chang .................. G06Q 20/367
  705/65
8,108,255 B1 * 1/2012 Robinson ........... G06Q 30/0631
  705/14.44

(Continued)

FOREIGN PATENT DOCUMENTS

CN 107038609 8/2017

OTHER PUBLICATIONS

Patkar et al., "A New way for Semi Supervised Learning Based on Data Mining for Product Reviews", 2nd IEEE International Conference on Engineering and Technology (ICETECH), Mar. 2016, 6 pages.

(Continued)

*Primary Examiner* — Ming Shui
(74) *Attorney, Agent, or Firm* — Tutunjian & Bitetto, P.C.; Joseph Petrokaitis

(57) ABSTRACT

A system is provided that includes a server having a first engine, a second engine, a search word warehouse, and a purchasing engine. The first engine (i) maps topics to product features of products using a topic hotness method which computes a hotness degree of a product on a topic from (a) product identifiers, (b) product features, (c) customer comments, and (d) topics with relevant key words, and (ii) builds a model providing a relevance degree of a topic to a product feature. The model is built based on the hotness degree. The second engine extracts remarkable topics based on product features using a method applied to the relevance degree of the topic to the product feature to identify remarkable topics for each product. The search word warehouse stores the remarkable topics for each product. The purchasing engine conducts purchases of products identified in searches using the remarkable topics.

20 Claims, 7 Drawing Sheets

(58) Field of Classification Search
USPC .................................................. 705/26.1–27.2
See application file for complete search history.

(56) References Cited

U.S. PATENT DOCUMENTS

| | | | |
|---|---|---|---|
| 8,301,514 B1* | 10/2012 | Vippagunta | G06Q 30/0631 |
| | | | 705/26.7 |
| 8,515,828 B1 | 8/2013 | Wolf et al. | |
| 8,566,178 B1* | 10/2013 | Robinson | G06Q 30/06 |
| | | | 705/26.7 |
| 8,577,754 B1* | 11/2013 | Chanda | G06Q 30/02 |
| | | | 705/26.7 |
| 9,595,053 B1 | 3/2017 | Cunico et al. | |
| 2008/0215543 A1 | 9/2008 | Huang et al. | |
| 2008/0215571 A1 | 9/2008 | Huang et al. | |
| 2011/0040759 A1 | 2/2011 | Rappoport et al. | |
| 2011/0078157 A1* | 3/2011 | Sun | G06F 16/313 |
| | | | 707/749 |
| 2014/0379682 A1 | 12/2014 | Du et al. | |
| 2017/0071134 A1 | 3/2017 | Li et al. | |
| 2017/0220943 A1* | 8/2017 | Duncan | G06F 8/38 |

OTHER PUBLICATIONS

Popescu et al., "Extracting Product Features and Opinions from Reviews", HLT '05 Proceedings of the conference on Human Language Technology and Empirical Methods in Natural Language Processing, Oct. 2005, 8 pages.

Li et al., "Automatic Extraction for Product Feature Words from Comments on the Web", AIRS 2009, Oct. 2009, pp. 112-123.

* cited by examiner

SCENARIO ENHANCED SEARCH WITH PRODUCT FEATURES

BACKGROUND

Technical Field

The present invention generally relates to data processing, and more particularly to scenario enhanced search with product features.

Description of the Related Art

One widely used method for searching products in business to consumer (B2C) websites is to match a user defined key word to comments from other users (hereinafter "user comments). However, if few comments have been published for a product or a new product is launched, this method cannot produce good results. Hence, there is a need for a way to build a relationship between a product and groups of key words that users may potentially use to comment on the product.

SUMMARY

According to an aspect of the present invention, a scenario enhanced search system is provided. The scenario enhanced search system includes a server. The server has a first engine for (i) mapping topics to product inherent features of a set of products using a topic hotness method which computes a hotness degree of a product on a topic from (a) product identifiers, (b) the product inherent features, (c) customer comments, and (d) the topics with relevant key words, and (ii) building a mapping training model which provides a relevance degree of a topic to a product inherent feature. The mapping training model is built based on the hotness degree of the product on the topic. The server further has a second engine for extracting remarkable topics from the topics based on the product inherent features using a threshold and statistical method applied to the relevance degree of the topic to the product inherent feature to identify a list of the remarkable topics for each of the products. The server also has a search word warehouse for storing the list of remarkable topics for each of the products. The server additionally has a purchasing engine for conducting e-commerce purchases of the products identified in searches using the list of remarkable topics stored in the search word warehouse for each of the products.

According to another aspect of the present invention, a computer-implemented method is provided for scenario enhanced search. The method includes mapping, by a first engine of a computer server, topics to product inherent features of a set of products using a topic hotness method which computes a hotness degree of a product on a topic from (a) product identifiers, (b) the product inherent features, (c) customer comments, and (d) the topics with relevant key words. The method further includes building, by the first engine, a mapping training model which provides a relevance degree of a topic to a product inherent feature. The mapping training model is built based on the hotness degree of the product on the topic. The method also includes extracting, by a second engine of the computer server, remarkable topics from the topics based on the product inherent features using a threshold and statistical method applied to the relevance degree of the topic to the product inherent feature to identify a list of the remarkable topics for each of the products. The method additionally includes storing, by a search word warehouse of the computer server, the list of remarkable topics for each of the products. The method further includes conducting, by a purchasing engine of the computer server, e-commerce purchases of the products identified in searches using the list of remarkable topics stored in the search word warehouse for each of the products.

According to yet another aspect of the present invention, a computer program product is provided for scenario enhanced search. The computer program product includes a non-transitory computer readable storage medium having program instructions embodied therewith. The program instructions are executable by a computer server to cause the computer server to perform a method. The method includes mapping, by a first engine of the computer server, topics to product inherent features of a set of products using a topic hotness method which computes a hotness degree of a product on a topic from (a) product identifiers, (b) the product inherent features, (c) customer comments, and (d) the topics with relevant key words. The method further includes building, by the first engine, a mapping training model which provides a relevance degree of a topic to a product inherent feature. The mapping training model is built based on the hotness degree of the product on the topic. The method also includes extracting, by a second engine of the computer server, remarkable topics from the topics based on the product inherent features using a threshold and statistical method applied to the relevance degree of the topic to the product inherent feature to identify a list of the remarkable topics for each of the products. The method additionally includes storing, by a search word warehouse of the computer server, the list of remarkable topics for each of the products, The method further includes conducting, by a purchasing engine of the computer server, e-commerce purchases of the products identified in searches using the list of remarkable topics stored in the search word warehouse for each of the products.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to scenario enhanced search with product features.

In an embodiment, the present invention can provide search results for products that do not have sufficient or even any user comments (from users other than the user initiating the search) with which a matching process can be performed. Advantageously, a product with little or no comments, but similar inherent features with products already having plenty of comments can be listed in search results thus overcoming the aforementioned deficiency of the prior art.

As used herein, the following definitions apply. The term "topic" refers to a group of the same and/or similar key words that can be used to describe the topic, and the topic can be used to describe a product inherent feature. Hence, as an example, for the topic of good-looking style, corresponding key words can include, but are not limited to: beautiful, nice, pretty, and so forth. The term "product inherent features" refers to features that are innate to a product. Thus, as example, for a fridge as the product, product inherent features can include the following: color (White); door structure (three door); panel type (colored glass); display screen (Liquid Crystal Display), and so forth.

Figure 1:
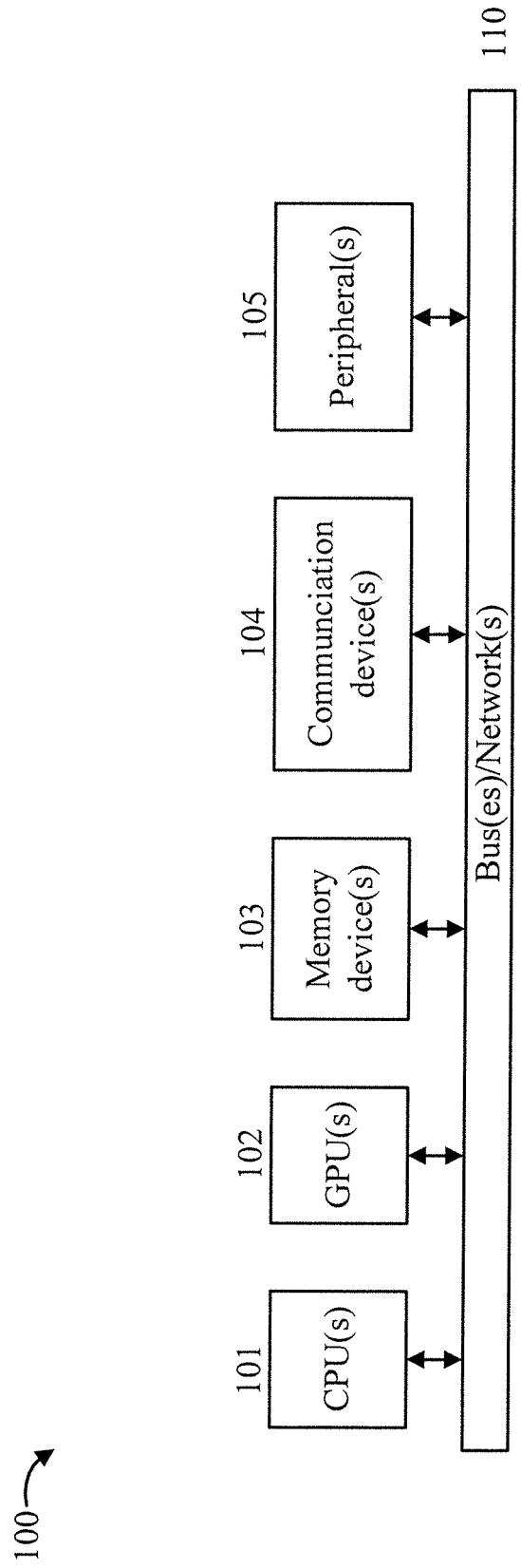
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 6-7). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
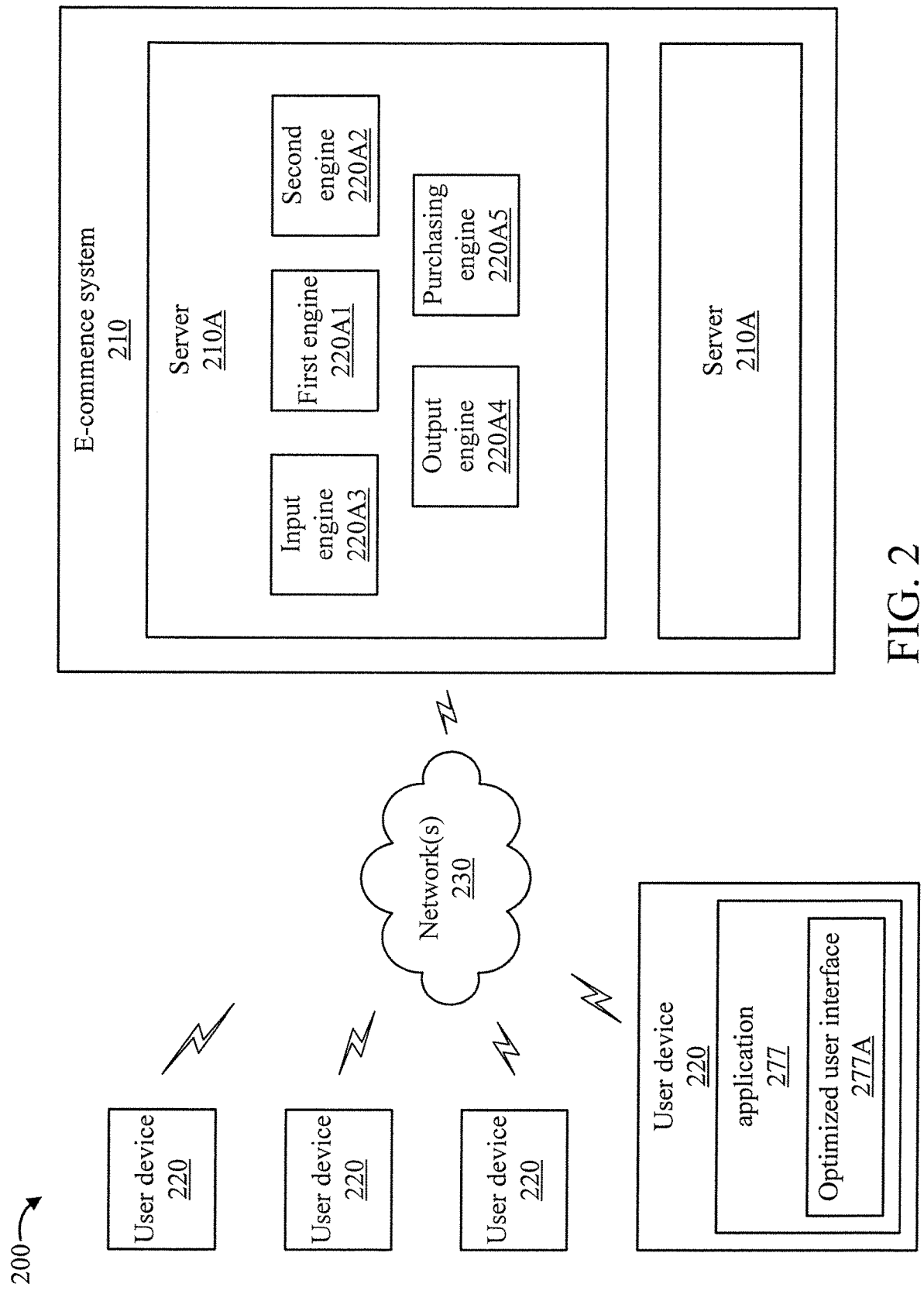
FIG. 2 is a block diagram showing an exemplary environment to which the present invention can be applied, in accordance with an embodiment of the present invention.

FIG. 2 is a block diagram showing an exemplary environment 200 to which the present invention can be applied, in accordance with an embodiment of the present invention.

The environment 200 includes an e-commerce system 210 for interfacing with multiple user devices 220 over one or more communication networks (collectively referred to as "communication network" using the figure reference numeral 230).

The user devices 220 can be any type of communication device that can permit conducting searches and transacting purchases. For example, smart phones, smart watches, tablets, laptops, and so forth can be used.

The user devices 220 can be dispersed across any region including globally. The E-commerce system 210 allows the user devices 220 to engage in purchases of products that are identified in a product search. In performing the product search, the user may be prompted to input certain information relating to a product such as product inherent features in order to search for particular products having the same or similar or related product inherent features. The search may involve a (1) key words matching topics, and (2) topics matching inherent features. As each product must have inherent features, even products with little or no comments and newly launched products can be identified in search results, thus leading to increase sales from the discovery and offering for sale of products that would otherwise not be detected by a conventional search process that does not use e-commerce system 210. In an embodiment, each of the user devices 220 runs or access an application 277 having an optimized user interface 277A for detecting search items based on product inherent features. As such, the interface 277A is specifically configured to receive particular input information such as (a) product identifiers, (b) product inherent features, (c) customer comments, and (d) topics with relevant (corresponding) key words that form and/or otherwise describe the topics. Moreover, the interface 277A can specifically highlight products having little to no comments that would not have likely been discovered using conventional search techniques. In this way, essentially "hidden" products can be discovered and presented to the user for purchase. Moreover, the interface 277A can specify the product inherent features that led to its discovery. Additionally, the interface 277A can include the input and output engines described herein, thus allowing a conversational dialog between the user and the e-commence system 210 through the use of techniques including, but not limited to, Automatic Speech Recognition (ASR), Natural Language Processing (NLP), and Text-To-Speech (TTS) generation. These and other features of the interface 277A are readily determined by one of ordinary skill in the art, given the teachings of the present invention provided herein.

In an embodiment, the e-commerce system 210 includes one or more servers 210A. Each of the servers 210A includes by itself or in a distributive manner, an input engine 210A3, a first engine 210A1, a second engine 210A2, an output engine 210A4, and a purchasing engine 210A5. The engines can be implemented by a processor executing specially programmed software modules, or by Application Specific Integrated Circuits (ASICs), depending upon the implementation. Of course, other elements and configurations can also be used.

The input engine 210A3 can include a Natural Language Processing (NLP) system and/or Automatic Speech Recognition System (ASR) for receiving user inputs (e.g., acoustic inputs) and transforming the same into a form capable of being processed by a processor based device. To that end, word parsing and key word extraction can be performed on user descriptions of product inherent features sought by the user in a product the user intends to purchase.

The output engine 210A4 can include a Text-To-Speech (TTS) system for transforming the output of system 210 into an acoustic form.

The input engine 210A3 and the output engine 210A4 enable a user to interact with the e-commerce system 210 using a conversational dialog to enhance the user's experience can make it be similar to what a salesperson would say in recommending products to a user/buyer.

The purchasing engine 210A5 conducts e-commerce purchases of the products resulting from searches using the list of remarkable topics for each of the products stored in the word warehouse.

A description will now be given relative to FIG. 3 regarding an exemplary component architecture of the present invention. Various exemplary methods will be described with corresponding equations for implementing the methods. Each equation is defined along with all its variables, even if the variable occurs in an earlier equation because the variables can differ in meaning from equation to equation. Accordingly, the setting forth of all variables involved in each equation right after that equation without further reference is done for the sake of clarity and completeness.

Figure 3:
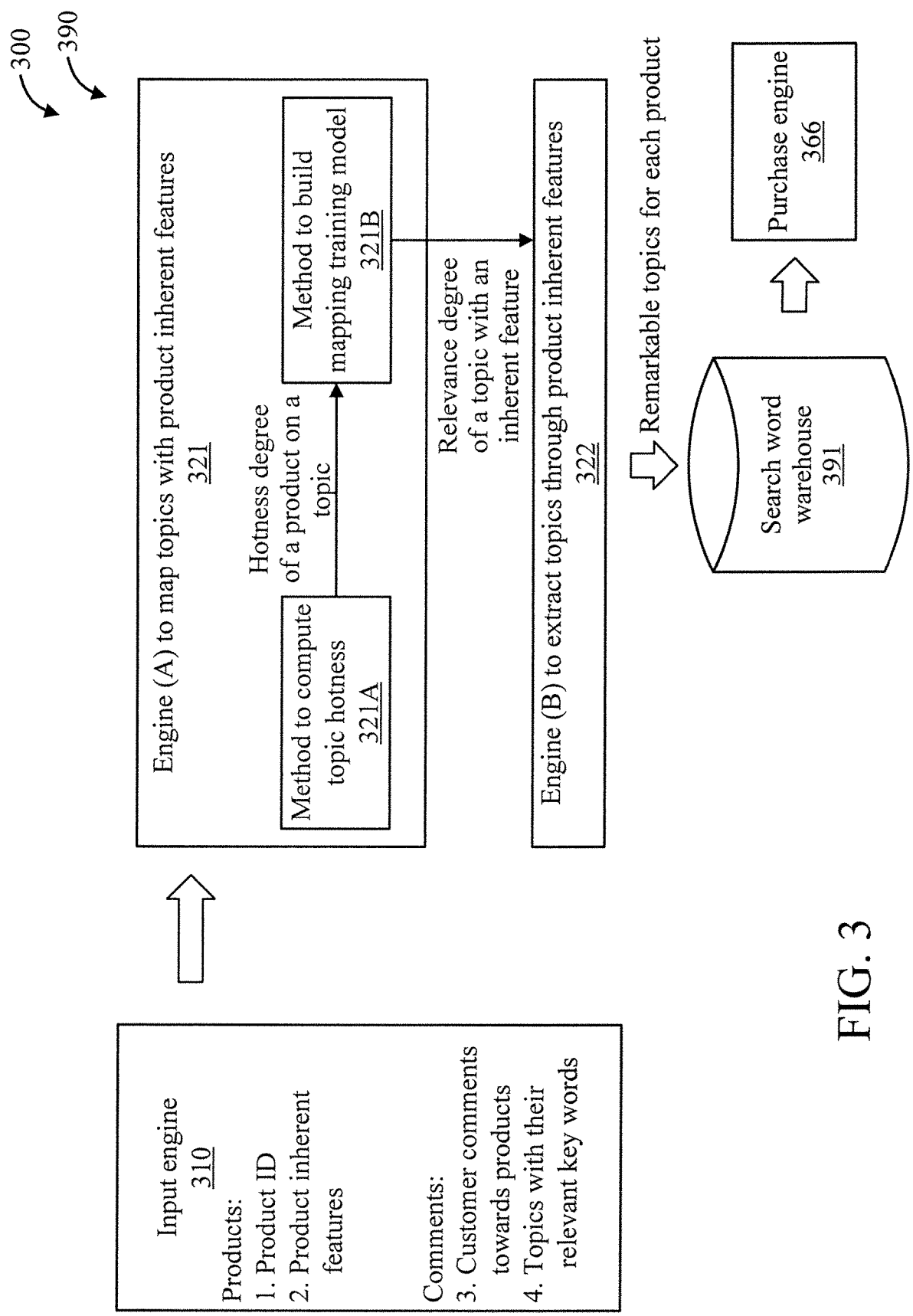
FIG. 3 is a block diagram showing an exemplary component architecture, in accordance with an embodiment of the present invention.
Figure 4:
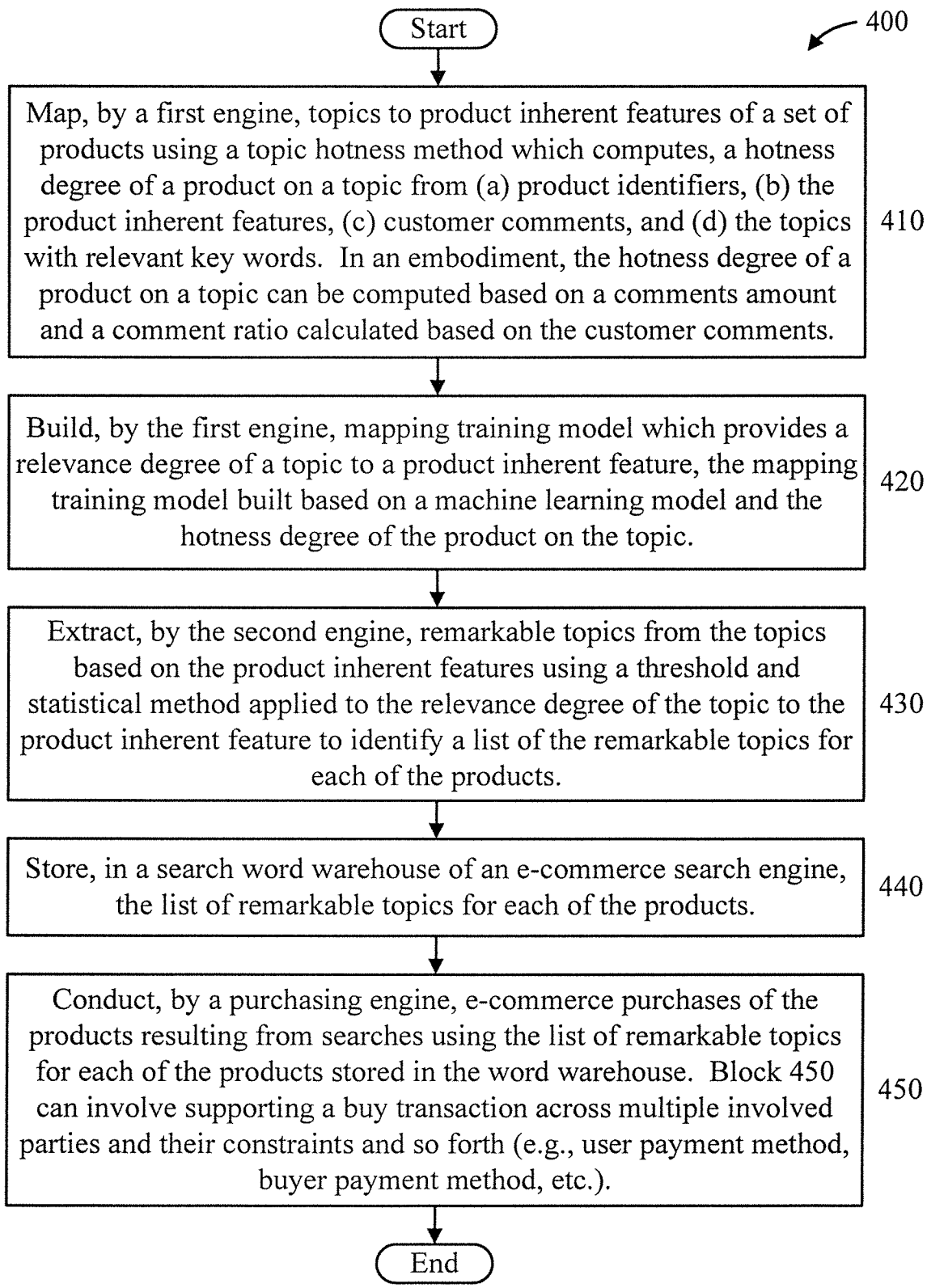
FIG. 4 is a flow diagram showing an exemplary method for scenario enhanced search with product features, in accordance with an embodiment of the present invention.

It is noted that the component architecture is further described, followed by a description of a method for performing the present invention relative to FIG. 4. Thereafter, a more detailed explanation of the components of FIG. 3 and the steps involved in the method of FIG. 4 will be more fully described for the sake of completeness.

FIG. 3 is a block diagram showing an exemplary component architecture 300, in accordance with an embodiment of the present invention.

The component architecture 300 includes an input engine 310 coupled to an engine (A) 321 and an engine (B) 322.

The component architecture 300 can further include a word warehouse 391 of an e-commerce search engine 390. In an embodiment, as shown in FIG. 3, engine (A) 321 and engine (B) 322 are part of e-commerce search engine 390. In another embodiment, engine (A) 321 and engine (B) 322 can be separate from, but operatively coupled to, the e-commerce search engine 390 and possible other search engines in order to support the e-commerce search engines in making sales. The component architecture can also include a purchase engine 366.

Engine (A) 321 is for mapping topics with product inherent features. Engine (B) 322 is for extracting topics through product inherent features.

Engine A includes a method 321A to compute topic hotness and a method 321B to build a mapping training model. The output of the method 321A, which is also an input to the method 321B, is a hotness degree of a product on a topic. The output of the method 321B, which is an input to engine (B) 322, is the relevance degree of a topic with an inherent feature.

As used herein, the term "topic hotness" refers to a frequency of appearance of a topic over time. Thus, a first topic that is hotter than a second topic will appear more frequently over a given time period than the second topic.

The output of engine (B) 322 is a list of remarkable topics for each product. The list of remarkable topics for each product are stored in the word warehouse 391 and used to conduct e-commerce transactions by finding products for people to purchase (that otherwise may not be found by prior art approaches).

The purchase engine 366 uses the list of remarkable topics for each product to conduct searches and discover products that would otherwise by undiscoverable due to having to few comments. In an embodiment, the customer comments for a given one of the products consists of a null set.

FIG. 4 is a flow diagram showing an exemplary method 400 for scenario enhanced search with product features, in accordance with an embodiment of the present invention.

At block 410, map, by a first engine, topics to product inherent features of a set of products using a topic hotness method which computes, a hotness degree of a product on a topic from (a) product identifiers, (b) the product inherent features, (c) customer comments, and (d) the topics with relevant key words. In an embodiment, the hotness degree of a product on a topic can be computed based on a comments amount and a comment ratio calculated based on the customer comments. In an embodiment, block 410 relates to method 321A described herein.

At block 420, build, by the first engine, mapping training model which provides a relevance degree of a topic to a product inherent feature, the mapping training model built based on a machine learning model and the hotness degree of the product on the topic. In an embodiment, block 420 relates to method 321B described herein.

At block 430, extract, by the second engine, remarkable topics from the topics based on the product inherent features using a threshold and statistical method applied to the relevance degree of the topic to the product inherent feature to identify a list of the remarkable topics for each of the products.

At block 440, store, in a search word warehouse of an e-commerce search engine, the list of remarkable topics for each of the products.

At block 450, conduct, by a purchasing engine, e-commerce purchases of the products resulting from searches using the list of remarkable topics for each of the products stored in the word warehouse. Block 450 can involve supporting a buy transaction across multiple involved parties and their constraints and so forth (e.g., user payment method, buyer payment method, etc.).

Referring back to FIG. 3, as noted above, in an embodiment, the present invention includes two main engines, namely engine (A) 321 and engine (B) 322.

Engine (A) 321 is configured to map topics with product inherent features. In an embodiment, engine (A) 321 will first use a new topic hotness method 321A to provide a hotness degree of a product on a topic. This hotness method 321A takes into account both comments amount (absolute value) and comment ratio (relative value). The reason to use a hotness method is that if users have same comment number on a specific topic over two products, the comments that total fewer for a given product should be considered more important to a product than comments that total more. With the input of hotness degree of a product on a topic generated by the aforementioned hotness method 321A, a new method 321B is used to build a mapping training model. This mapping training model takes into account both a general machine learning model and the hotness degree. The hotness degree can enhance the training model with significant hotness degree.

Engine (B) 322 is configured to extract topics through product features. Based on the relevance degree of a topic with an inherent feature generated by engine (A) 321, engine (B) 322 can use a threshold and statistical method to identify the remarkable topics for each inherent feature. Thus, the searching process is then transformed into (1) key words matching topics, and (2) topics matching inherent features. As each product must have inherent features, those products with few comment and new launched products can be found out.

A description will now be given regarding engine (A) 321 to map topics with product inherent features.

The description will commence with a component involving a method 321A to compute topic hotness.

In an embodiment, a hotness degree of a product on a topic is defined as follows:

$$\text{hotness}(P_i, T_j) = \text{function}[\text{Num}(P_i, T_j), \text{Ratio}(P_i, T_j)]$$

where
hotness($P_i$, $T_j$) denotes the hotness degree of a product on a topic;
$P_i$ denotes product i;
$T_j$ denotes topic j;
Num($P_i$, $T_j$) denotes the comment amount for product $P_i$ on topic $T_j$; and
Ratio ($P_i$, $T_j$) denotes the comment ratio for product $P_i$ on topic $T_j$.

The comment amount can refer to the total number of comment submissions provided by different users.

The description will continue with a first available method 321A1 for implementing topic hotness, in accordance with an embodiment of the present invention.

In an embodiment, the first available method 321A1 involves the following:

$$\text{Hotness}(P_i T_{j,+}) = \log[\text{Num}(P_i, T_{j,+})] * \text{Ratio}(P_i, T_{j,+})$$

where
$P_i$ denotes product i;
$T_j$ denotes topic j;
Num($P_i$, $T_{j,+}$) denotes absolute hotness; and
Ratio($P_i$, $T_{j,+}$) denotes relative hotness.

The description will continue with a second available method 321A2 for implementing topic hotness, in accordance with an embodiment of the present invention.

In an embodiment, the second available method 321A2 involves the following:

$$\text{Hotness}(P_i, T_{j,+}) = \log[\text{Num}(P_i, T_{j,+})] + \alpha * \text{Ratio}(P_i, T_{j,+})$$

where
$P_i$ denotes product i;
$T_j$ denotes topic j;
Num($P_i$, $T_{j,+}$) denotes absolute hotness;
Ratio ($P_i$, $T_{j,+}$) denotes relative hotness; and
α denotes a balance factor.

It is to be appreciated that while methods 321A1 and 321A2 implement the "function" of the general equation by a logarithmic function, other types of functions can also be used, as readily appreciated by one of ordinary skill in the art given the teachings of the present invention provided herein, while maintaining the spirit of the present invention.

The description will continue with a component involving a method 321B to build a mapping training model.

In an embodiment, the relevance degree of a topic with an inherent feature is defined as follows:

$$\widetilde{Error}(t) = \text{Min } \Sigma_d^D f[\text{Hotness}(d,t), \text{Error}(\text{model}[X_{1,d,t}, X_{2,d,t}, X_{n-1,d,t}, X_{n,d,t}], Y_{d,t})]$$

where
D denotes a training data set (all products with user comments);
l denotes the product inherent feature set;
t denotes topic t;
$Y_{d,t}$ denotes a value of training data d on topic t;
$\chi_{i,d,t}$ denotes a value of training data d for inherent feature i on topic t; and
Hotness(d, t) denotes topic hotness training data d on topic t.

The Model[$\chi_{i,d,t}, \chi_{2,d,t}, \chi_{n-1,d,t}, \chi_{n,d,t}$] portion is a general model that can be implemented by many methods, as readily appreciated by one of ordinary skill in the art. For example, some exemplary methods that can be used include, but are not limited to: linear regression methods; logistic regression methods; and neural network based methods. Described hereinafter, first and second available methods 321B1 and 321B2 involve linear regression methods, third and fourth available methods 321B3 and 321B4 involve logistic regression methods, and fifth and sixth available methods 321B5 and 321B6 involve neural network based methods.

The description will continue with a first available method 321B1 for building a mapping training model, in accordance with an embodiment of the present invention.

In an embodiment, the first available method 321B1 involves the following:

$$\widetilde{Error}(t) = \text{Min } \Sigma_d^D \{\text{Hotness}(d,t)[y_{d,t} - \beta_{0,t} - \Sigma_i^l \beta_{i,t} X_{i,t,d}]^2\}$$

where
D denotes a training data set (all products with user comments);
l denotes the product inherent feature set;
t denotes topic t;
$Y_{d,t}$ denotes a value of training data d on topic t;
$\beta_{0,t}$ denotes a common co-efficiency 0 on topic t;
$\beta_{i,t}$ denotes a co-efficiency of inherent feature i on topic t;
$\chi_{i,t,d}$ denotes a value of training data d for inherent feature i on topic t;
Hotness(d, t) denotes topic hotness training data d on topic t; and
the last term occurring after the second minus sign represents a linear regression.

The description will continue with a second available method 321B2 for building a mapping training model, in accordance with an embodiment of the present invention.

In an embodiment, the second available method 321B2 involves the following:

$$\widetilde{Error}(t) = \text{Min } \Sigma_d^D \{\alpha * \text{Hotness}(d,t)[y_{d,t} - \beta_{0,t} - \Sigma_i^l \beta_{i,t} X_{i,t,d}]^2\}$$

where
D denotes a training data set (all products with user comments);
l denotes the product inherent feature set;
t denotes topic t;
$Y_{d,t}$ denotes a value of training data d on topic t;
$\beta_{0,t}$ denotes a common co-efficiency 0 on topic t;
$\beta_{i,t}$ denotes a co-efficiency of inherent feature i on topic t;
$\chi_{i,t,d}$ denotes a value of training data d for inherent feature i on topic t;
Hotness (d, t) denotes topic hotness training data d on topic t; and
the last term occurring after the second minus sign represents a linear regression.

The description will continue with a third available method 321B3 for building a mapping training model, in accordance with an embodiment of the present invention.

In an embodiment, the third available method 321B3 involves the following:

$$\widetilde{Error}(t) = \operatorname{Min} \sum_d^D \left\{ \operatorname{Hotness}(d,t) \left\{ Y_{d,t} \sum_i^I \beta_{i,t} X_{i,t,d} - \log\left(1 + e^{\sum_i^I \beta_{i,t} X_{i,t,d}}\right) \right\} \right\}$$

where

D denotes a training data set (all products with user comments);
l denotes the product inherent feature set;
t denotes topic t;
$Y_{d,t}$ denotes a value of training data d on topic t;
$\beta_{i,t}$ denotes a co-efficiency of inherent feature i on topic t;
$\chi_{i,t,d}$ denotes a value of training data d for inherent feature i on topic t;
Hotness(d, t) denotes topic hotness training data d on topic t; and
the last term occurring after the second minus sign represents a logistic regression.

The description will continue with a fourth available method 321B4 for building a mapping training model, in accordance with an embodiment of the present invention.

In an embodiment, the fourth available method 321B4 involves the following:

$$\widetilde{Error}(t) = \operatorname{Min} \sum_d^D \left\{ \alpha * \operatorname{Hotness}(d,t) + \left\{ Y_{d,t} \sum_i^I \beta_{i,t} X_{i,t,d} - \log\left(1 + e^{\sum_i^I \beta_{i,t} X_{i,t,d}}\right) \right\} \right\}$$

where

D denotes a training data set (all products with user comments);
l denotes the product inherent feature set;
t denotes topic t;
$Y_{d,t}$ denotes a value of training data d on topic t;
$\beta_{i,t}$ denotes a co-efficiency of inherent feature i on topic t;
$\chi_{i,t,d}$ denotes a value of training data d for inherent feature i on topic t;
Hotness(d, t) denotes topic hotness training data d on topic t; and
the last term occurring after the second minus sign represents a logistic regression.

The description will continue with a fifth available method 321B5 for building a mapping training model, in accordance with an embodiment of the present invention.

In an embodiment, the fifth available method 321B5 involves the following:

$$\widetilde{Error}(t) = \operatorname{Min} \Sigma_d^D \{ \operatorname{Hotness}(d,t) \{ |Y_{d,t} - \widehat{Y_{a,t}}| \} \}$$

where

D denotes a training data set (all products with user comments);
l denotes the product inherent feature set;
t denotes topic t;
$Y_{d,t}$ denotes a value of training data d on topic t;
$\beta_{i,t}$ denotes a co-efficiency of inherent feature i on topic t;
$\beta_{k,t}$ denotes a co-efficiency of inherent feature i on topic t of hidden node;
$\chi_{i,t,d}$ denotes a value of training data d for inherent feature i on topic t;
Hotness(d,t) denotes topic hotness training data d on topic t; and
$f(\ )$ denotes an activation function of a hidden node;
$\theta_k$ denotes a threshold;
$\widehat{Y_{a,t}} = f(\Sigma_k^K \beta_{k,t} f(\Sigma_i^I \beta_{i,t} * X_{i,t,d} - \theta_k) - \theta_o)$; and
$\{|Y_{d,t} - \widehat{Y_{a,t}}|^2\}$ denotes a neural network.

The description will continue with a sixth available method 321B6 for building a mapping training model, in accordance with an embodiment of the present invention.

In an embodiment, the sixth available method 321B6 involves the following:

$$\widetilde{Error}(t) = \operatorname{Min} \Sigma_d^D \{ \alpha * \operatorname{Hotness}(d,t) + \{ |Y_{d,t} - \widehat{Y_{a,t}}|^2 \} \}$$

where

D denotes a training data set (all products with user comments);
l denotes the product inherent feature set;
t denotes topic t;
$Y_{d,t}$ denotes a value of training data d on topic t;
$\beta_{i,t}$ denotes a co-efficiency of inherent feature i on topic t;
$\beta_{k,t}$ denotes a co-efficiency of inherent feature i on topic t of hidden node;
$\chi_{i,t,d}$ denotes a value of training data d for inherent feature i on topic t;
Hotness(d, t) denotes topic hotness training data d on topic t; and
α denotes a balance factor.
$f(\ )$ denotes an activation function of a hidden node;
$\theta_k$ denotes a threshold;
$\widehat{Y_{a,t}} = f(\Sigma_k^K \beta_{k,t} f(\Sigma_i^I \beta_{i,t} * X_{i,t,d} \theta_k) - \theta_o)$; and
$\{|Y_{d,t} - \widehat{Y_{a,t}}|^2\}$ denotes a neural network.

A description will now be given regarding engine (B) 322 to extract topics through product inherent features.

Based on the relevance degree of a topic with an inherent feature generated by the previous engine, engine (B) 322 an use a threshold and statistical method to identify the remarkable topics for each inherent features. In an embodiment, the output of engine (B) 322 includes remarkable topics for each product.

Figure 5:
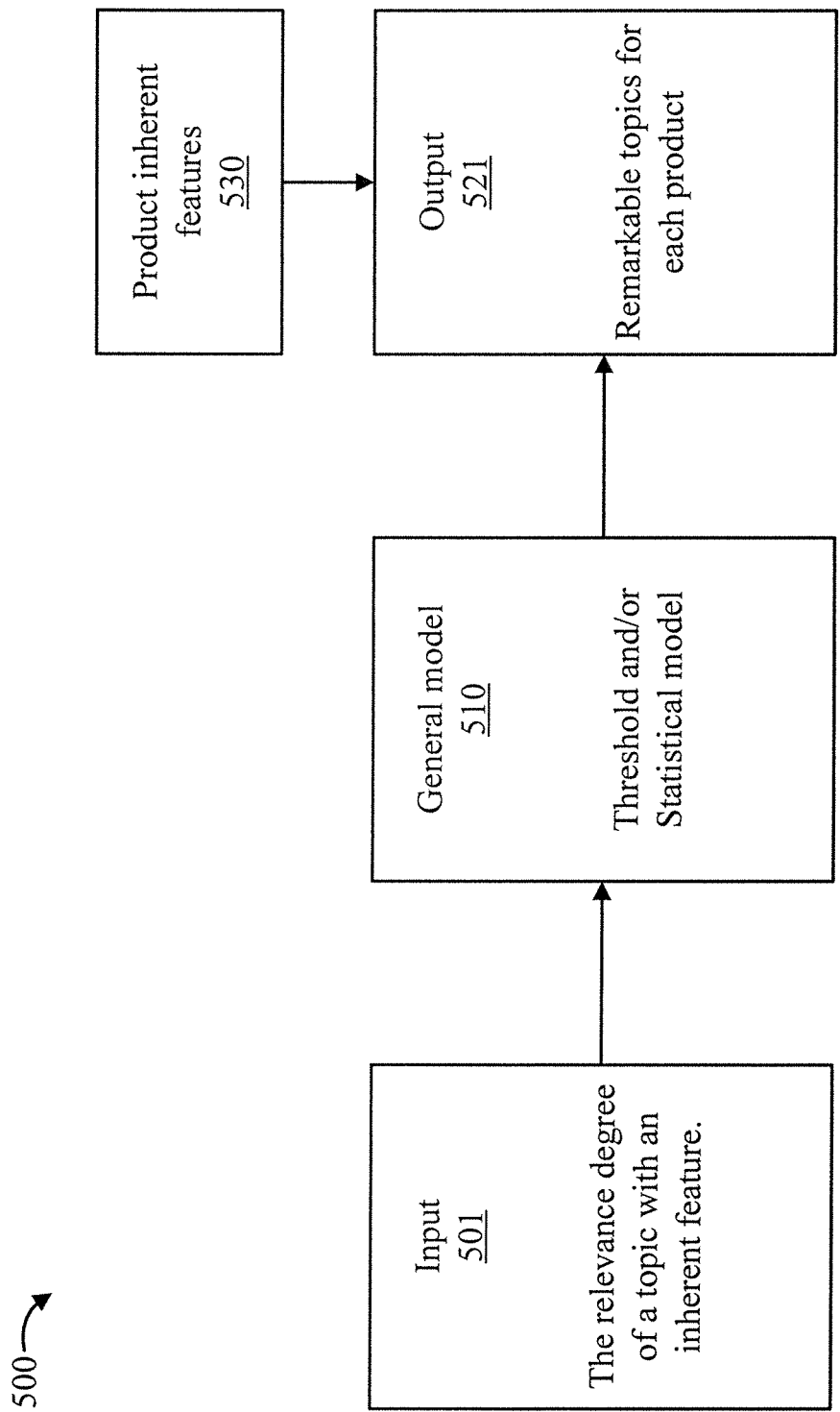
FIG. 5 is a block diagram showing an exemplary topic extraction for a particular refrigerator, in accordance with an embodiment of the present invention.

FIG. 5 is a block diagram showing an exemplary topic extraction 500 using engine (B) for a particular refrigerator, in accordance with an embodiment of the present invention.

The input 501 to the topic extraction is the relevance degree of a topic with an inherent feature.

A general model 510 is applied to the relevance degree of a topic with an inherent feature. The general model 510 can include a threshold portion and/or a statistical model portion. The output 521 of the general model 510, relative to a set of product inherent features 530, is a list of remarkable topics for each product.

Thus, the relevance degree on a topic with an inherent feature is input 501 to the general model 510 which, for a given set of product inherent features, then outputs remarkable topics for each product.

As an example relating to a refrigerator, consider the following topics (with each topic having its corresponding relevance degree with an inherent feature specified in parenthesis):
Topic 1: good looking style (Relevance Degree: 0.9)
Topic 2: elegant (Relevance Degree: 0.95)
Topic 3: Good Quality (Relevance Degree: 0.4)
Topic 4: No Noise (Relevance Degree: 0.2)

Further to the example, the given set of product inherent features can be color (white), door structure (three door), panel type (colored glass), and display screen (Liquid Crystal Display). Further to the example, the list of remarkable topics for refrigerator ID 321DB (the product) are good looking style and elegant.

Further regarding the threshold portion 510A, the same can involve applying a predetermined threshold applied to the Relevance Degree in order to identify and include only the features having a corresponding Relevance Degree above the threshold as outputs.

The statistical model portion 510B can be used to determine the threshold that is, in turn, used by the threshold portion 510A. In an embodiment, the statistical model portion 510B determines the threshold based on one or more statistical methods applied to historical data (preferably of a similar nature, i.e., having the same or similar product inherent features). In this way, avoidance in using an arbitrary threshold is achieved, thus providing better results in ultimate relevance.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
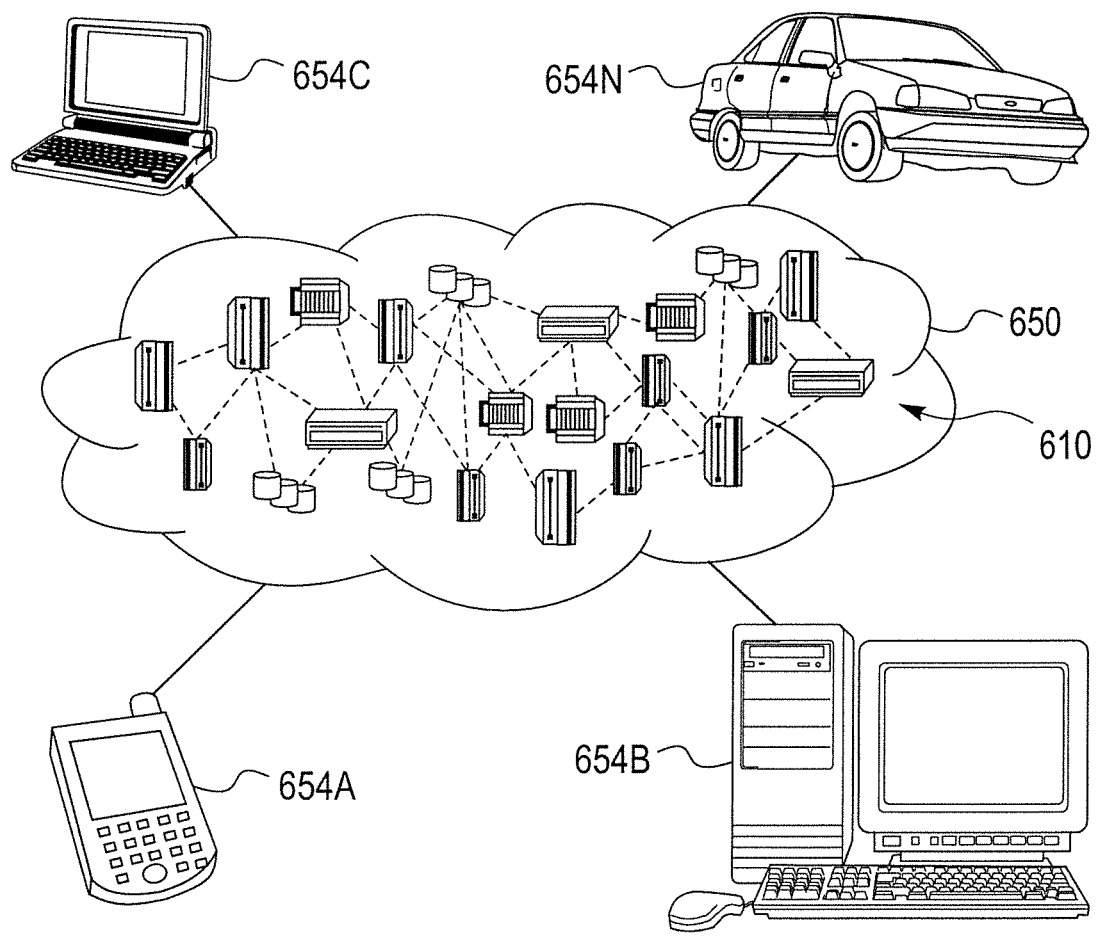
FIG. 6 is a block diagram showing an exemplary cloud computing environment, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
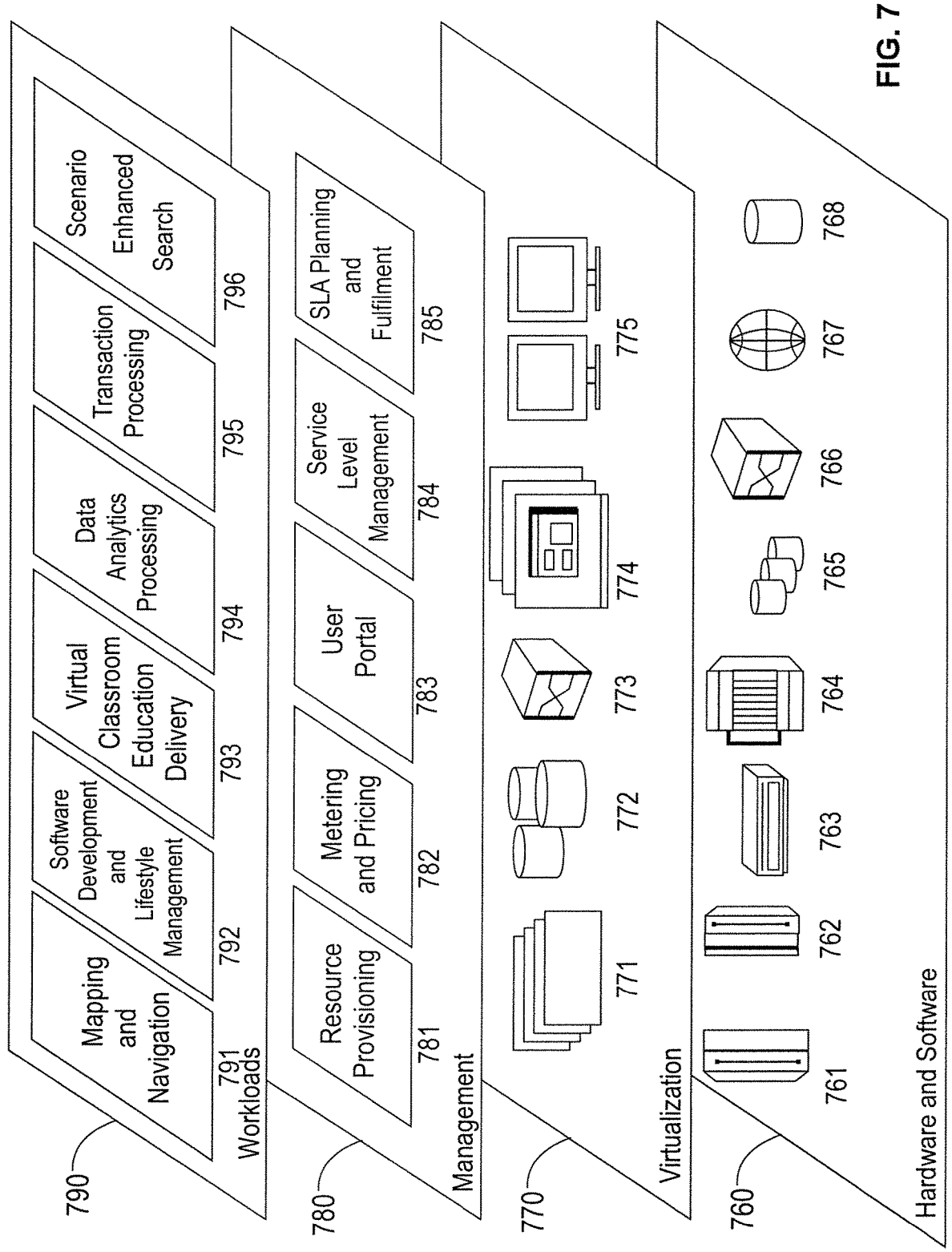
FIG. 7 is a block diagram showing exemplary abstraction model layers, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and scenario enhanced search with product features 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A scenario enhanced search and purchase system, comprising: a server, having a first engine configured to (i) map topics to product inherent features of a set of products using a topic hotness method weighing topics with a lack of customer comments as more important than the topics with the customer comments and
   compute a hotness degree of a product on a topic from (a) product identifiers, (b) the product inherent features, (c) the lack of customer comments, and (d) the topics with relevant key words, and
   (ii) build a mapping training model which provides a relevance degree of a topic to a product inherent feature, the mapping training model built based on the hotness degree of the product on the topic;
   a second engine configured to extracting remarkable topics from the topics based on the lack of customer comments and the product inherent features using a threshold and statistical method applied to the relevance degree of the topic to the product inherent feature to identify a list of the remarkable topics for each of the products;
   a search word warehouse configured to store the list of remarkable topics for each of the products; and
   a purchasing engine configured to conduct hidden product e-commerce purchases of the products identified in searches having the lack of the customer comments using the list of remarkable topics stored in the search word warehouse for each of the products.

2. The scenario enhanced search system of claim 1, wherein the topic hotness method computes the hotness degree of the product on the topic based on a comments amount and a comment ratio.

3. The scenario enhanced search system of claim 1, wherein the comments amount is respectively computed for each of the products on each of the topics, and wherein the comment ratio is respectively computed for each of the products on each of the topics over a total number of topics on the each of the products.

4. The scenario enhanced search system of claim 1, wherein the topic consists of a group of at least similar key words used to describe a particular topic.

5. The scenario enhanced search system of claim 1, wherein the customer comments for a given one of the products consists of a null set.

6. The scenario enhanced search system of claim 1, wherein the first and second engines are configured to identify any of the products with similar product inherent features to other ones of the products having more than a threshold amount of comments.

7. The scenario enhanced search system of claim 1, wherein the mapping training model is built further based on a machine learning model.

8. The scenario enhanced search system of claim 7, where the machine learning model is a neural network.

9. The scenario enhanced search system of claim 1, wherein the mapping training model is built by applying a linear regression operation to the hotness degree of the product on the topic.

10. The scenario enhanced search system of claim 1, wherein the mapping training model is built by applying a logistic regression operation to the hotness degree of the product on the topic.

11. The scenario enhanced search system of claim 1, wherein the hotness degree of the product on the topic is computed further based on a value of a particular training data object for a particular one of the product inherent features on the topic.

12. The scenario enhanced search system of claim 1, wherein the mapping training model is built further based on a value of a particular training data object for a particular one of the product inherent features on the topic.

13. A computer-implemented method for scenario enhanced search and purchase, comprising:
   mapping, by a first engine of a computer server, topics to product inherent features of a set of products using a topic hotness method weighing topics with a lack of customer comments as more important than the topics with the customer comments and
   computes a hotness degree of a product on a topic from (a) product identifiers, (b) the product inherent features, (c) the lack of customer comments, and (d) the topics with relevant key words; and
   building, by the first engine, a mapping training model which provides a relevance degree of a topic to a product inherent feature, the mapping training model built based on the hotness degree of the product on the topic;
   extracting, by a second engine of the computer server, remarkable topics from the topics based on the lack of customer comments and the product inherent features using a threshold and statistical method applied to the relevance degree of the topic to the product inherent feature to identify a list of the remarkable topics for each of the products;
   storing, by a search word warehouse of the computer server, the list of remarkable topics for each of the products; and
   conducting, by a purchasing engine of the computer server, hidden product e-commerce purchases of the products identified in searches having the lack of the customer comments using the list of remarkable topics stored in the search word warehouse for each of the products.

14. The computer-implemented method of claim 13, wherein the topic hotness method computes the hotness degree of the product on the topic based on a comments amount and a comment ratio.

15. The computer-implemented method of claim 13, wherein the comments amount is respectively computed for each of the products on each of the topics, and wherein the comment ratio is respectively computed for each of the products on each of the topics over a total number of topics on the each of the products.

16. The computer-implemented method of claim 13, wherein the topic consists of a group of at least similar key words used to describe a particular topic.

17. The computer-implemented method of claim 13, wherein the customer comments for a given one of the products consists of a null set.

18. The computer-implemented method of claim 13, wherein the first and second engines are configured to identify any of the products with similar product inherent features to other ones of the products having more than a threshold amount of comments.

19. The computer-implemented method of claim 13, wherein the mapping training model is built further based on a machine learning model.

20. A computer program product for scenario enhanced search and purchase, the computer program product comprising a non-transitory computer readable storage medium having program instructions embodied therewith, the program instructions executable by a computer server to cause the computer server to perform a method comprising:
   mapping, by a first engine of the computer server, topics to product inherent features of a set of products using a topic hotness method weighing topics with a lack of customer comments as more important than the topics with customer comments and computes a hotness degree of a product on a topic from (a) product identifiers, (b) the product inherent features, (c) the lack of customer comments, and (d) the topics with relevant key words; and
   building, by the first engine, a mapping training model which provides a relevance degree of a topic to a product inherent feature, the mapping training model built based on the hotness degree of the product on the topic;
   extracting, by a second engine of the computer server, remarkable topics from the topics based on the lack of customer comments and the product inherent features using a threshold and statistical method applied to the relevance degree of the topic to the product inherent feature to identify a list of the remarkable topics for each of the products;
   storing, by a search word warehouse of the computer server, the list of remarkable topics for each of the products; and
   conducting, by a purchasing engine of the computer server, hidden product e-commerce purchases of the products identified in searches having the lack of the customer comments using the list of remarkable topics stored in the search word warehouse for each of the products.

* * * * *